United States Patent
Nievergelt et al.

(10) Patent No.: US 6,556,914 B2
(45) Date of Patent: Apr. 29, 2003

(54) SEMIAUTOMATIC CONTROL SYSTEM AND METHOD FOR VEHICLES

(75) Inventors: Ueli Nievergelt, Adliswil (CH); Rüdiger Franke, Heidelberg (DE)

(73) Assignee: DaimlerChrysler Rail Systems GmbH, Berlin (DE)

( * ) Notice: Subject to any disclaimer, the term of this patent is extended or adjusted under 35 U.S.C. 154(b) by 0 days.

(21) Appl. No.: 09/832,838

(22) Filed: Apr. 12, 2001

(65) Prior Publication Data

US 2001/0051846 A1 Dec. 13, 2001

(30) Foreign Application Priority Data

Apr. 12, 2000 (DE) .......................................... 100 18 083

(51) Int. Cl.[7] .............................................. B60K 31/04
(52) U.S. Cl. ........................................... 701/93; 701/20
(58) Field of Search ............................. 701/20, 93, 96, 701/97

(56) References Cited

U.S. PATENT DOCUMENTS

| | | | | |
|---|---|---|---|---|
| 3,655,962 A | * | 4/1972 | Koch ..................... | 246/182 C |
| 4,181,943 A | * | 1/1980 | Mercer et al. .......... | 246/182 B |
| 4,566,067 A | * | 1/1986 | Sahasrabudhe et al. ..... | 701/117 |
| 5,006,989 A | * | 4/1991 | Parker .................... | 246/182 C |

FOREIGN PATENT DOCUMENTS

| | | |
|---|---|---|
| DE | 19502954 A1 * | 8/1995 |
| DE | 44 34 022 A1 | 3/1996 |
| DE | 197 11 819 A1 | 10/1997 |
| EP | 0 755 840 A1 | 1/1997 |

OTHER PUBLICATIONS

Development of an On–Board Energy Saving Train Operation System for the Shinkansen Electric Railcars, by Sinobu Yasukawa, et al., published in Quarterly Reports of RTRI, Tokyo, 28 (2–4):54–62, 1987.

Rechnergestütze energiesparende Fahrweise im Regelbetrieb [Computer Assisted, energy–saving driving method in closed–loop control mode] by Gerhard Voss, et al., published in ETR—Eisenbahntechnische Rundschau, 47(1):25–31, 1998.

Einfluss der Fahrtechnik auf den Energieverbrauch eines Personenzugs [Influence of driving technique on the energy consumption of a passenger train] by Bozetech Sula, published in Elektrische Bahnen, 88(4):192–198, 1990.

* cited by examiner

Primary Examiner—Michael J. Zanelli
(74) Attorney, Agent, or Firm—Burns, Doane, Swecker & Mathis, L.L.P.

(57) ABSTRACT

A semiautomatic control system or control method ensures a driving method which is as energy-saving as possible. In the system, there is both a) manual inputting of control data, for example a definition of a vehicle speed specified value, by the driver of the vehicle and b) automatic determination of the most energy-saving vehicle speed as a function of predefined peripheral conditions, for example a general travel schedule, the topology of a route, vehicle-specific peripheral conditions and the like. An inference system determines which of these two values is smaller, and the smaller value is used to make possible safe and at the same time energy-saving travel (or journey). A safety check of the manual travel speed input value and of the automatically determined travel speed specified value can also be performed to reliably prevent a maximum permissible travel speed value from being exceeded.

4 Claims, 5 Drawing Sheets

SEMIAUTOMATIC CONTROL SYSTEM AND METHOD FOR VEHICLES

The present invention relates to a semiautomatic control system and a method for vehicles.

FIELD OF THE INVENTION

When journeys are made with vehicles, in particular rail vehicles, numerous peripheral conditions must be taken into account in order to determine control commands such as accelerating, braking or the definition of setpoint speeds. The peripheral conditions are, for example, a general travel schedule, temporary characteristics (for example owing to roadworks or engineering works), signalling devices, specified values set by a control centre, the topology of the route, weather influences and vehicle-specific peripheral conditions such as the mass of the vehicle or traction mass, maximum power and maximum speed. Furthermore, remaining degrees of freedom can be utilized in order to optimize the driving method, for example with respect to minimum energy consumption or minimum wear.

For this reason, it is suitable to use an automatic control system to provide support for a human driver of the vehicle.

Two different categories of control systems are conventionally known for this:
1. Manual control system with auxiliary means
    An example of such a control sequence is shown in FIG. 4. In such control systems, on the one hand automatic control actions or control data are determined automatically in a control device by reference to predefined peripheral conditions (step S41a) and displayed to the driver of the vehicle as decision suggestions on a display device (step S42a). In step S41m, the driver of the vehicle inputs control data to an input device, either taking into account the displayed decision suggestions for the control data or not taking them into account. In step S42m, the vehicle is then controlled in accordance with the control data which had been input.
2. Fully automatic control system with manual intervention feature
    The control sequence in such a control system is shown in FIG. 5. In such control systems, automatic control actions are applied directly. In step S51, control data for the vehicle are determined automatically with reference to predefined peripheral conditions. This automatically determined control data is output directly to the vehicle control device in step S53, without the driver of the vehicle having access to this control data. However, it is still possible for the driver of the vehicle to intervene manually (step S52) in situations relating to safety (emergencies) by inputting control data.

The first category of control systems, i.e. manual control systems with auxiliary means, is mostly found in contemporary implementations of a driving method which is optimized in terms of energy.

For example, in "Development of an on-board energy saving train operation system for the shinkansen electric railcars" by Shinobu Yasukawa, Shinichiro Fujita, Takehisa Hasebe and Koichi Sato in Quarterly Reports of RTRI, Tokyo, 28(2–4):54–62, 1987, and in "Rechnergestützte energiesparende Fahrweise im Regelbetrieb" [Computer-assisted, energy-saving driving method in closed-loop control mode] by Gerhard Voss and Dirk Sanftleben in "ETR—Eisenbahntechnische Rundschau" [Railway periodical], 47(1):25–31, 1998 a manual control system is described in which times for starting roll-out phases are suggested to the driver of the vehicle by means of an LED. The publication mentioned first additionally discloses that speed suggestions should be displayed, making it possible for this information to be output on a display device, for example a screen.

The second category of control systems, i.e. fully automatic control systems, has hitherto been applied principally in experimental trials. For example, in "Einfluss der Fahrtechnik auf den Energieverbrauch eines Personenzugs" [Influence of driving technique on the energy consumption of a passenger train] by Bozetech Sula in Elektrische Bahnen [Electric railways], 88(4):192–198, 1990 a comparison is made between manual and automatic operation, i.e. manual and fully automatic control systems. Here, it is determined by means of trials that the most energy saving driving method can be achieved with completely automatic control. A travel optimizer with a speed controller, a device for target breaking and a device for programmed control of the journey are used to perform control. Within the scope of these investigations it has been recognized that travelling using "auxiliary means", i.e. suggestions given by the travel optimizer, is relatively demanding for the driver of the vehicle because it is necessary to follow the readings of the measuring devices and the kilometer markings very strictly. In addition, when performing manual operation in response to suggestions it is not possible to achieve such fine gradation corresponding to the situation in which it has occurred.

In European patent application EP 0 755 840 A1, a method and a device for optimizing the driving method of a vehicle, preferably a rail vehicle, is disclosed. Here, both aforementioned categories of control systems are applied. Route data are permanently stored in a computing device before and/or during the journey. During the journey, dynamic status data relating to the distance and/or speed of the vehicle are recorded and fed to the computing device. A recommendation for a driving method which is optimized in terms of energy and/or as wear-free as possible is computed from said data. The computing result is displayed to the driver of the vehicle on a display device. The possibility of using these computing results directly for actuating the vehicle drive is also disclosed, so that a fully automatic control system is obtained in which the vehicle driver can intervene for safety reasons, but is not intended to do so during normal operation.

As a rule, the journey is monitored by safety devices in all control systems. For example, in the publication mentioned above "Development of an On-Board Energy-Saving Train Operation System for the Shinkansen Electric Railcars" a method of monitoring the speed is described in which when a permitted maximum speed (threshold value) is exceeded, automatic braking to a speed below this threshold can be initiated.

In the conventional manual control systems with auxiliary means described above it has, however, proven problematic that the human driver of the vehicle, who must in any case take into account numerous peripheral conditions and display instruments, must absorb and process additional information. This leads to additional loading. In addition, a computed optimized driving method may only be unsatisfactorily implemented owing to reading errors and time delays which inevitably occur. Furthermore, the driver of the vehicle may feel that these auxiliary means of the manual of control system are demotivating in that the decision suggestions remove the need for him to exercise his own initiative.

Such disadvantages no longer occur in a fully automatic control system such as is proposed in EP 0 755 840 A1, for example. In the publication cited above "Einfluss der Fahrtechnik auf den Energieverbrauch eines Personenzugs" [Influence of the driving technique on the energy consumption of a passenger train] it has even been shown that a driving method which is optimized in terms of energy can be implemented better in an automatic mode by means of a fully automatic control system.

However, the direct application of automatic control actions which are determined has the main disadvantage that they may be incorrect owing to peripheral conditions which are possibly only unsatisfactorily taken into account by the automatic control system. For this reason, it is currently not yet possible to dispense with the driver, and the driver has the task of monitoring, and if appropriate, intervening in the fully automatic control system, as proposed in EP 0 755 840 A1. However, this can lead to reduced attentiveness of the driver during a relatively long period of automatic operation, and thus entails, inter alia, the risk of in particular situations in which the driver should in fact intervene being overlooked. The direct application of automatic control actions which are determined is also a practical disadvantage because existing safety concepts for the automatic operation which is carried out with them has to be revised.

SUBJECT-MATTER OF THE INVENTION

For this reason, the object of the present invention is to design a semiautomatic control system and control method with which a driving method which is optimized in terms of energy can easily be achieved without losses in attentiveness of the driver of the vehicle inevitably occurring, and without existing safety concepts having to be revised.

It is thus ensured in a simple manner that both a computed optimum control means is precisely implemented and nevertheless the driver of the vehicle remains attentive during the entire journey. Furthermore, possible errors by the driver of the vehicle can be corrected by the semiautomatic control system or control method.

These and further objects, advantages and features of the invention are apparent from the detailed description below of a preferred exemplary embodiment of the semiautomatic control system according to the invention and control method according to the invention in conjunction with the drawing.

DESCRIPTION OF A PREFERRED EXEMPLARY EMBODIMENT OF THE INVENTION

In the semiautomatic control system or control method according to the invention, the control is influenced simultaneously by the driver of the vehicle and by an automatic control device. In an inference system, the specified values set by the driver of the vehicle and the automatic control device are combined to form control commands. This is shown in the block circuit diagram according to FIG. 1.

The design and method of operation of the semiautomatic control system and method according to the invention are explained below by means of an example of a semiautomatic control system for a rail vehicle with reference to FIG. 1. The semiautomatic control system and control method are, however, not restricted to this type of vehicle but can also be applied to other vehicles.

An application of the semiautomatic control system according to the invention in rail vehicles is, for example, the control of a train by means of a subordinate speed controller which sets a predefined setpoint speed.

Figure 1:
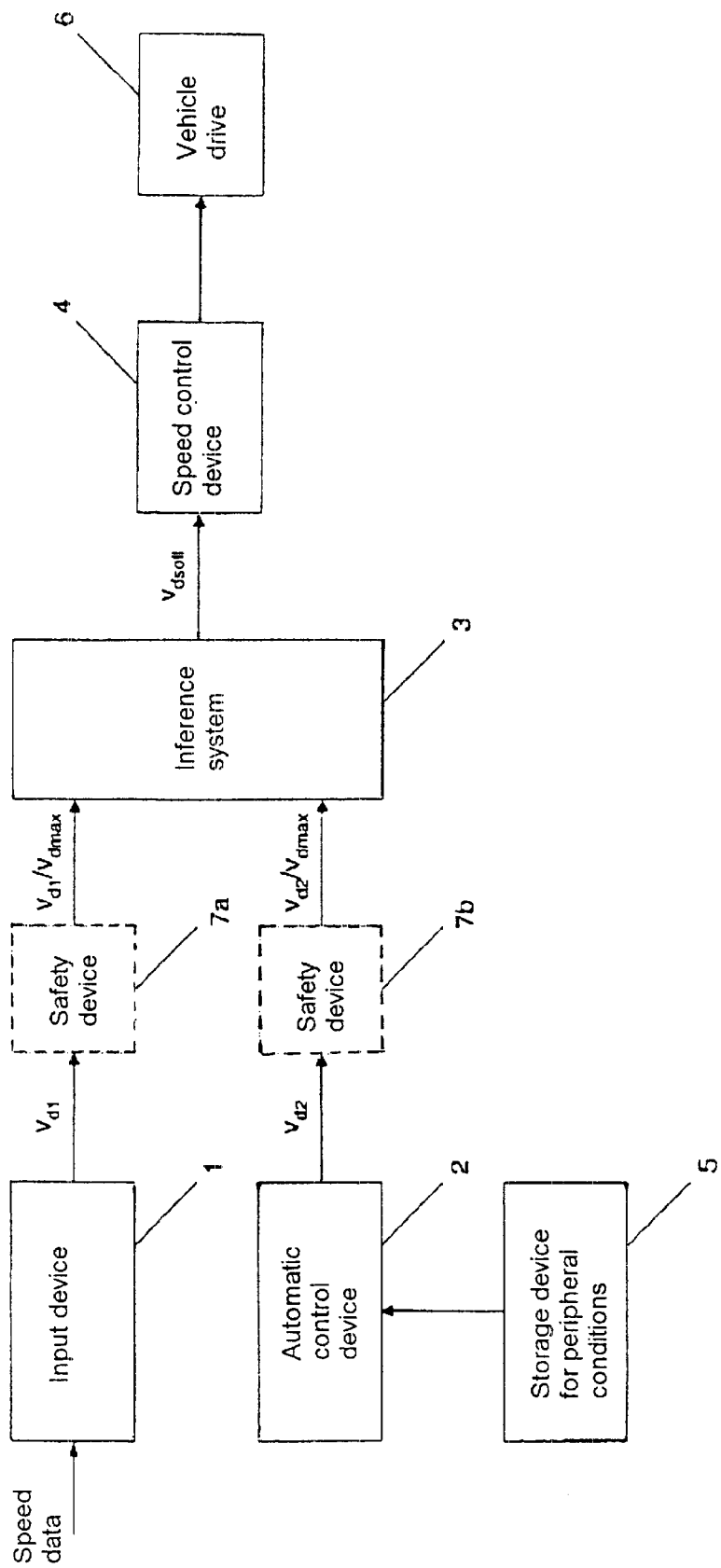
FIG. 1 shows a block circuit diagram of an example for a semiautomatic control system according to the invention.
Figure 2:
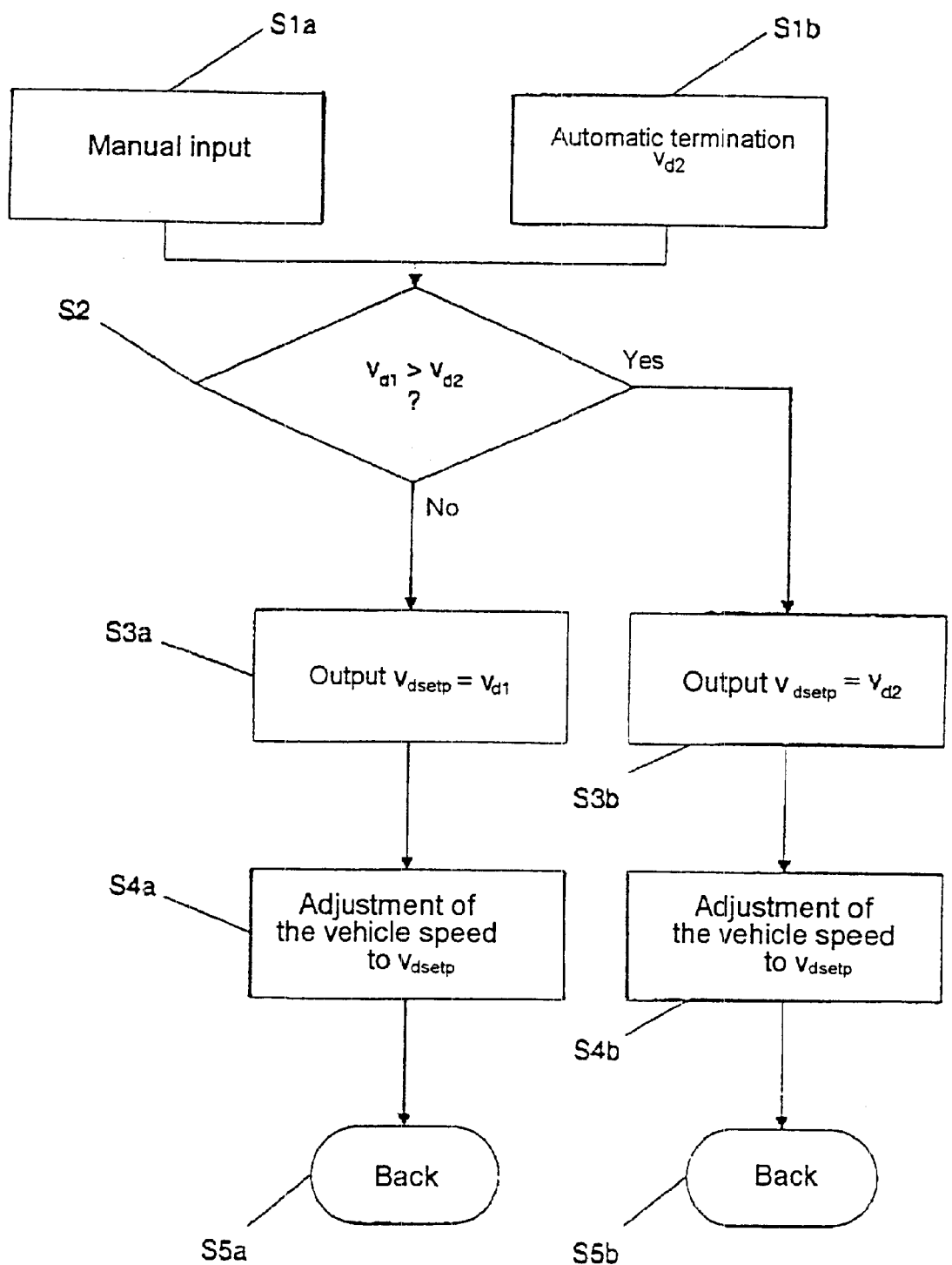
FIG. 2 shows a flowchart which explains in more detail the function of a control system according to the invention as in FIG. 1.

The semiautomatic control system according to the invention for vehicles is illustrated in FIG. 1 as a block circuit diagram, while FIG. 2 shows the functional sequence in the semiautomatic control system according to the invention, i.e. the semiautomatic control method according to the invention.

The semiautomatic control system according to the invention comprises an input device 1 for manually inputting a first travel speed specified value $v_{d1}$, an automatic control device 2 for automatically determining a second travel speed specified value $v_{d2}$, an inference system 3 for determining a setpoint speed $v_{dsetp}$, a speed control device 4 for controlling the travel speed, a storage device 5 for storing peripheral conditions and a vehicle drive 6.

A first travel speed specified value $v_{d1}$ is input by the driver of the vehicle by means of the input device 1 (step S1a). At the same time, the automatic control device 2 determines a second travel speed specified value $v_{d2}$ (step S1b) from peripheral conditions previously stored in the storage device 5, for example the general travel schedule, the topology of the route, vehicle-specific peripheral conditions such as, for example, the traction mass, maximum power and maximum speed and specified values set by the control center. These two travel speed specified values $v_{d1}$ and $v_{d2}$ are fed to the inference system 3 as input signals. The inference system 3 then determines the smaller of the two travel speed specified values $V_{d1}$ and $v_{d2}$ (step S2) and feeds these as setpoint travel speed ($vd_{dsetp}$) to the speed control device 4, for example a subordinate speed controller. This speed control device 4 correspondingly controls the speed of the vehicle in response to this setpoint travel speed $v_{dsetp}$ by means of the vehicle drive 6.

In this way, it is possible, for example, for the driver of the vehicle to set a maximum permissible route speed $v_{dmax}$ which is known to him. A lower value which is determined by the automatic control device 2 and by means of which it is possible to save energy, for example by using a time margin, is thus accepted by the inference system 3 and passed on to the speed control device 4 as a setpoint travel speed $v_{dsetp}$. In this way, a travel speed which is optimized in terms of energy is set.

Because, in addition, if the driver of the vehicle reduces the first travel speed specified value $v_{d1}$ below the value of the second travel speed specified value $v_{d2}$ of the automatic control device 2, in order, for example, to take into account a section of the route with reduced speed on a temporary basis, which is not known to the automatic control device 2 and the inference system 3 accepts the travel speed specified value $v_{d1}$ of the driver of the vehicle as a setpoint travel speed $v_{dsetp}$, a safe driving method is obtained in accordance with the current peripheral conditions, in addition to the driving method which is optimized in terms of energy.

Consequently, the semiautomatic control system according to the invention has the following advantages in comparison with the known control systems described above:

1. The driver is not additionally loaded, as in the case of manual operation with a decision suggestion system, because he does not have to assess any proposals of the control system and then execute or not execute them.
2. Optimized driving methods determined by the automatic control device can be implemented precisely because they are applied directly in compliance with the specified value set by the driver of the vehicle.
3. The driver of the vehicle, who is ultimately responsible—in contrast to automatic operation remains actively involved in the controlling of the vehicle and will thus maintain his concentration.

In addition, the semiautomatic control system can be extended in such a way that in the case in which the actual speed is monitored by a protection system, as described, for example, in the publication cited at the beginning "Development of an On-Board Energy-Saving Train Operation System for the Shinkansen Electric Railcars", the monitoring by the protection system is also expanded to the definition of values by the driver of the vehicle. This can be carried out by the embodiment of safety devices 7a and 7b illustrated by broken lines in FIG. 1.

Figure 3:
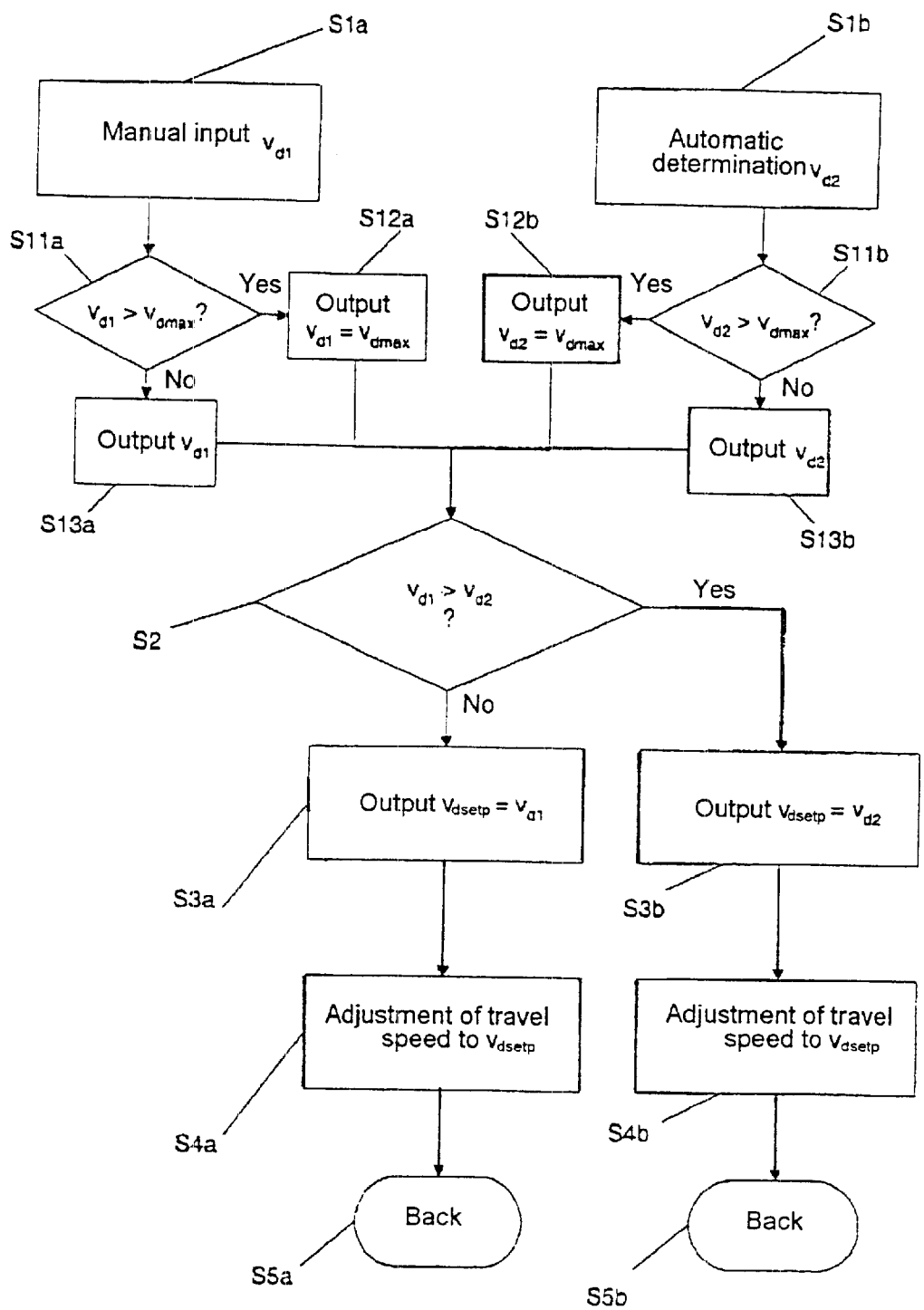
FIG. 3 shows a flowchart which explains in more detail the function of a control system according to the invention as in FIG. 1 with safety devices.
Figure 4:
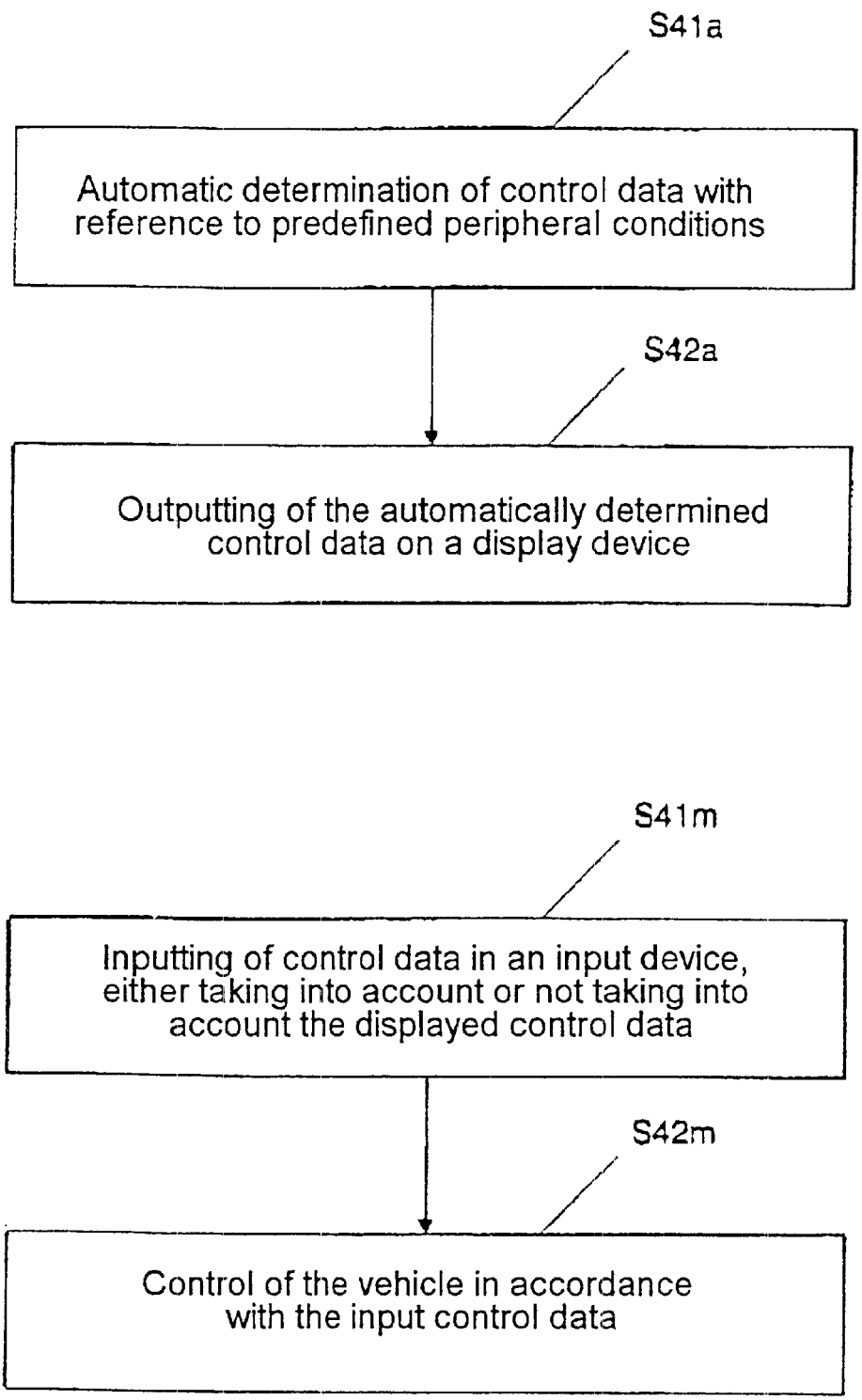
FIG. 4 shows a flowchart which represents the function of a manual control system with a decision suggestion system.
Figure 5:
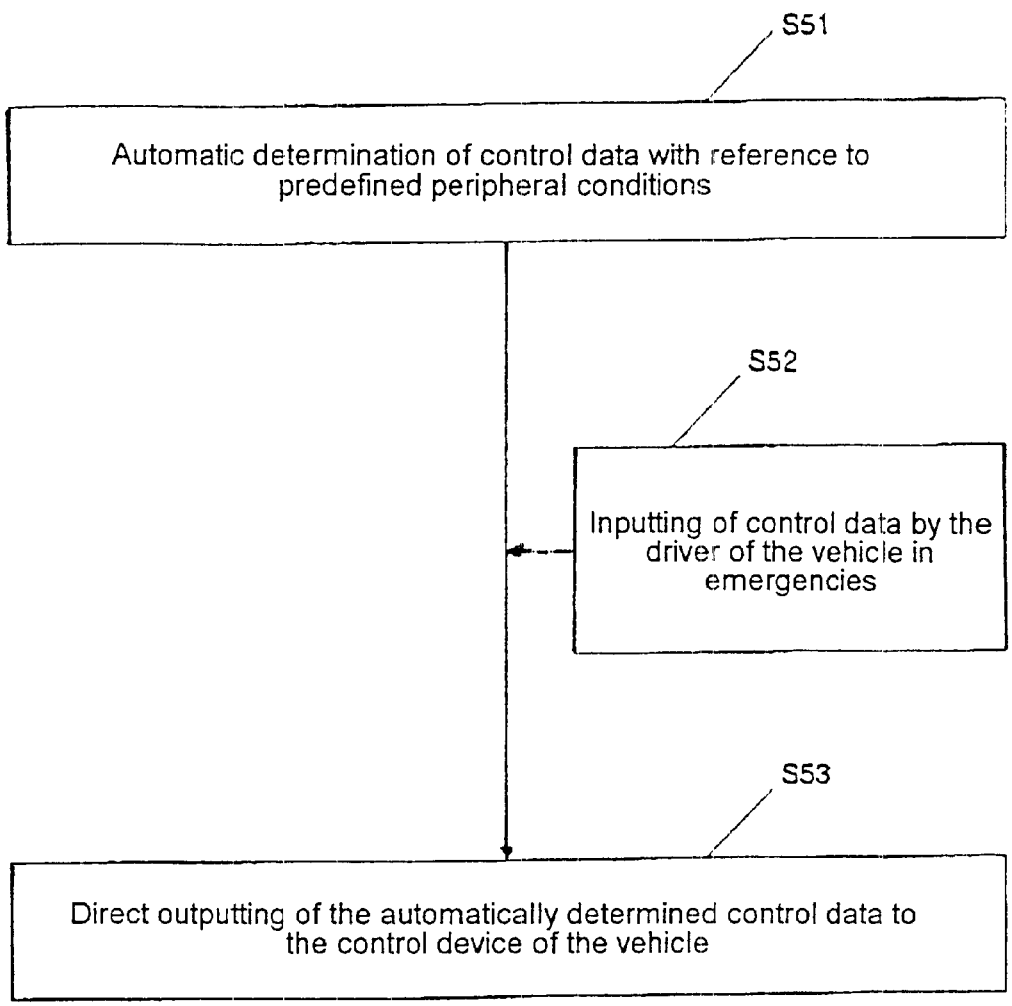
FIG. 5 shows a flowchart which represents the function of an automatic control system with intervention capability.

The functional sequence in a semiautomatic control system modified in such a way as illustrated in FIG. 3.

In contrast to the functional sequence according to FIG. 2, in this modified semiautomatic control system both the inputting in step S1a and the automatic result of the determination in step S1b are subject to checking by the security device 7a and 7b. In this way it is determined whether the respective value of $v_{d1}$ or $v_{d2}$ exceeds a maximum permissible travel speed value $v_{dmax}$. If this is the case, just one value for $v_{d1}$ or $v_{d2}$ to the magnitude of $v_{dmax}$ is output to the inference system 3. The other functional steps correspond to the functions shown in FIG. 2 and described with reference to FIG. 2, so that they are not explained in more detail.

This prevents the driver of the vehicle being able to set excessively high specified values which are not applied solely owing to the simultaneous action of the automatic control device. Inputting of an excessively high speed by the driver of the vehicle, which, in conjunction with an excessively high speed determined on the basis of out-of-date peripheral conditions, could lead to the vehicle being put at danger by the automatic control device, could be detected and corrected by the protection system.

In summary, the present invention discloses a semiautomatic control system and control method for ensuring a driving method which is as energy-saving as possible. In this system and method, there is both manual inputting of control data, for example of a travel speed specified value by the driver of the vehicle and automatic determination of the most energy-saving travel speed as a function of predefined peripheral conditions, such as a general timetable, the topology of a route, vehcile-specific peripheral conditions and the like. An inference system determines which of these two values is smaller, and said value is therefore used in order to permit reliable and at the same energy-saving travel. In addition, safety checking of the manual travel speed input value and of the automatically determined travel speed specified value can be carried out in order to reliably prevent a maximum permissible travel speed value from being exceeded.

What is claimed is:

1. Semiautomatic control system for a vehicle comprising:
   a first device for manually inputting a first travel speed specified value;
   an automatic control device for automatically determining a second travel speed specified value corresponding to peripheral conditions stored in a memory device; and
   an inference system to which the first and second travel speed specified values are fed, said inference system determining from said values the smaller travel speed specified value and outputting this as a setpoint travel speed to a speed control device for controlling the travel speed.

2. Semiautomatic control system of claim 1, comprising:
   a first safety device between the first device and the inference system, the first safety device being configured to carry out a check to determine whether the first travel speed specified value exceeds a predefined maximum travel speed value, and output the first travel speed specified value if the first travel speed specified value does not exceed the predefined maximum travel speed value, and output the predefined maximum travel speed value if the first travel speed specified value exceeds the predefined maximum travel speed value; and
   a second safety device between the automatic control device and the inference system, the second safety device being configured to carry out a check to determine whether the second travel speed specified value exceeds a predefined maximum travel speed value, and output the second travel speed specified value if the second travel speed specified value does not exceed the predefined maximum travel speed value, and output the predefined maximum travel speed value if the second travel speed specified value exceeds the predefined maximum travel speed value.

3. Semiautomatic control method for a vehicle, comprising:
   manual inputting of a first travel speed specified value into a device for manually inputting;
   automatically determining a second travel speed specified value in an automatic control device in accordance with peripheral conditions stored in a memory device;
   determining the smaller value of the first and second travel speed specified values in an inference system;
   outputting the determined value as a setpoint travel speed to a speed control device; and
   adjusting a travel speed of the vehicle to the setpoint travel speed by the speed control device.

4. Semiautomatic control method according to claim 3, comprising:
   before determining the setpoint travel speed, checking the first and second travel speed specified values in order to determine whether or not a maximum permissible travel speed value is exceeded;
   outputting each of the first and second travel speed specified values that does not exceed the maximum permissible travel speed value;
   outputting the maximum permissible travel speed value instead of the first travel speed specified value if the first travel speed specified value exceeds the maximum permissible travel speed value; and
   outputting the maximum permissible travel speed value instead of the second travel speed specified value if the second travel speed specified value exceeds the maximum permissible travel speed value.

* * * * *